Nov. 26, 1935. A. S. GRAHAM 2,022,596
BUNDLE TYING MACHINE
Filed July 29, 1932 10 Sheets-Sheet 1
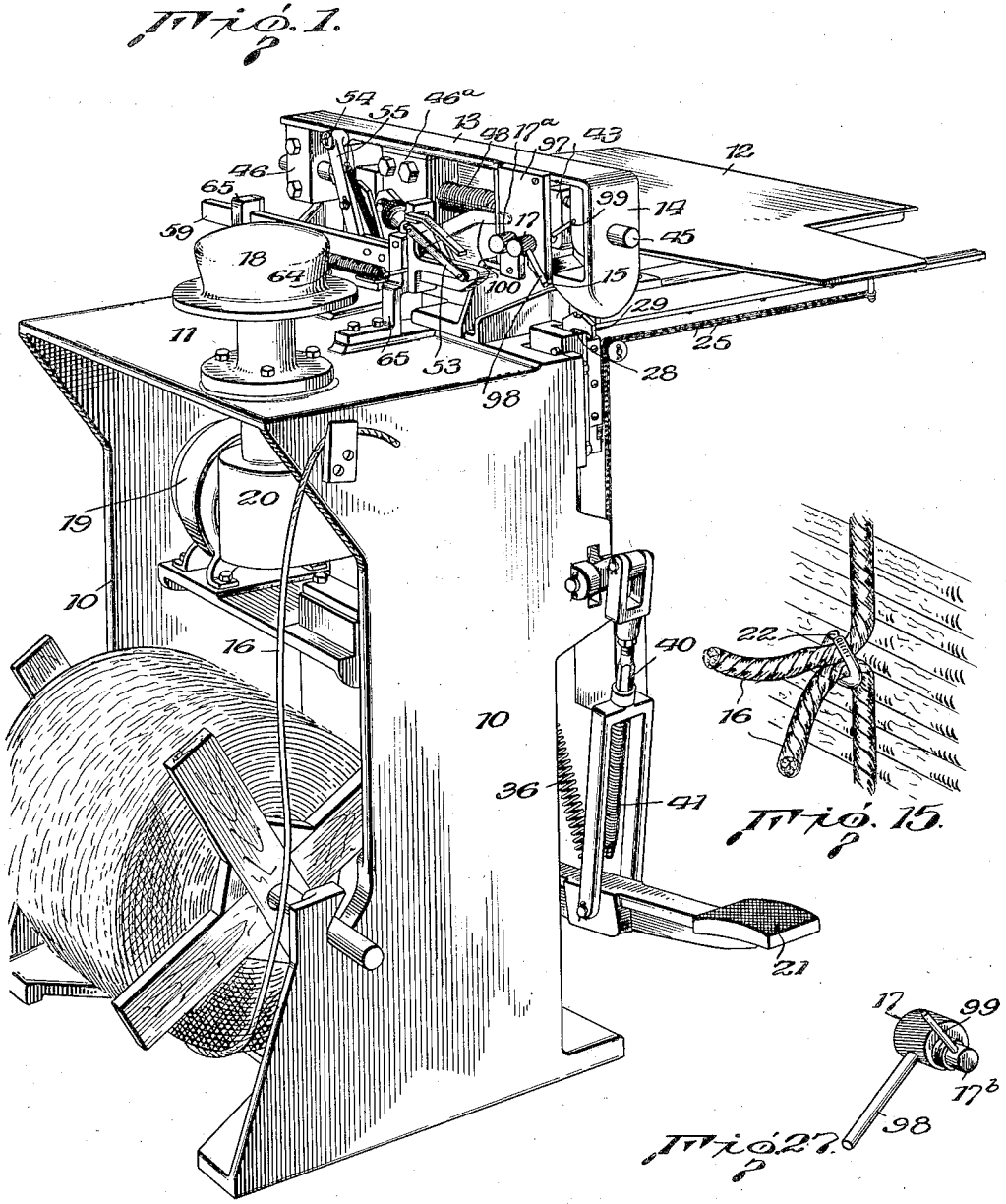

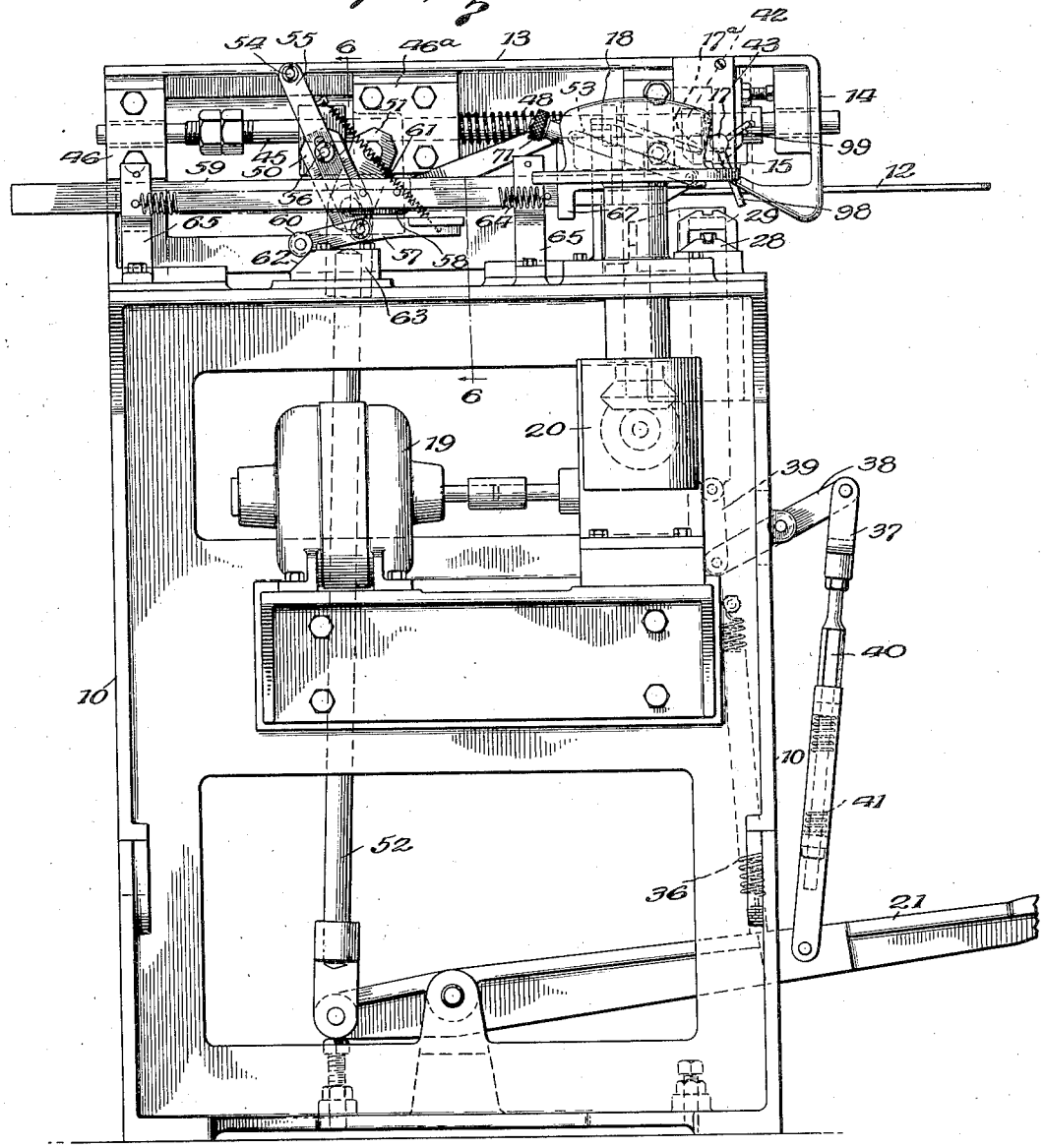

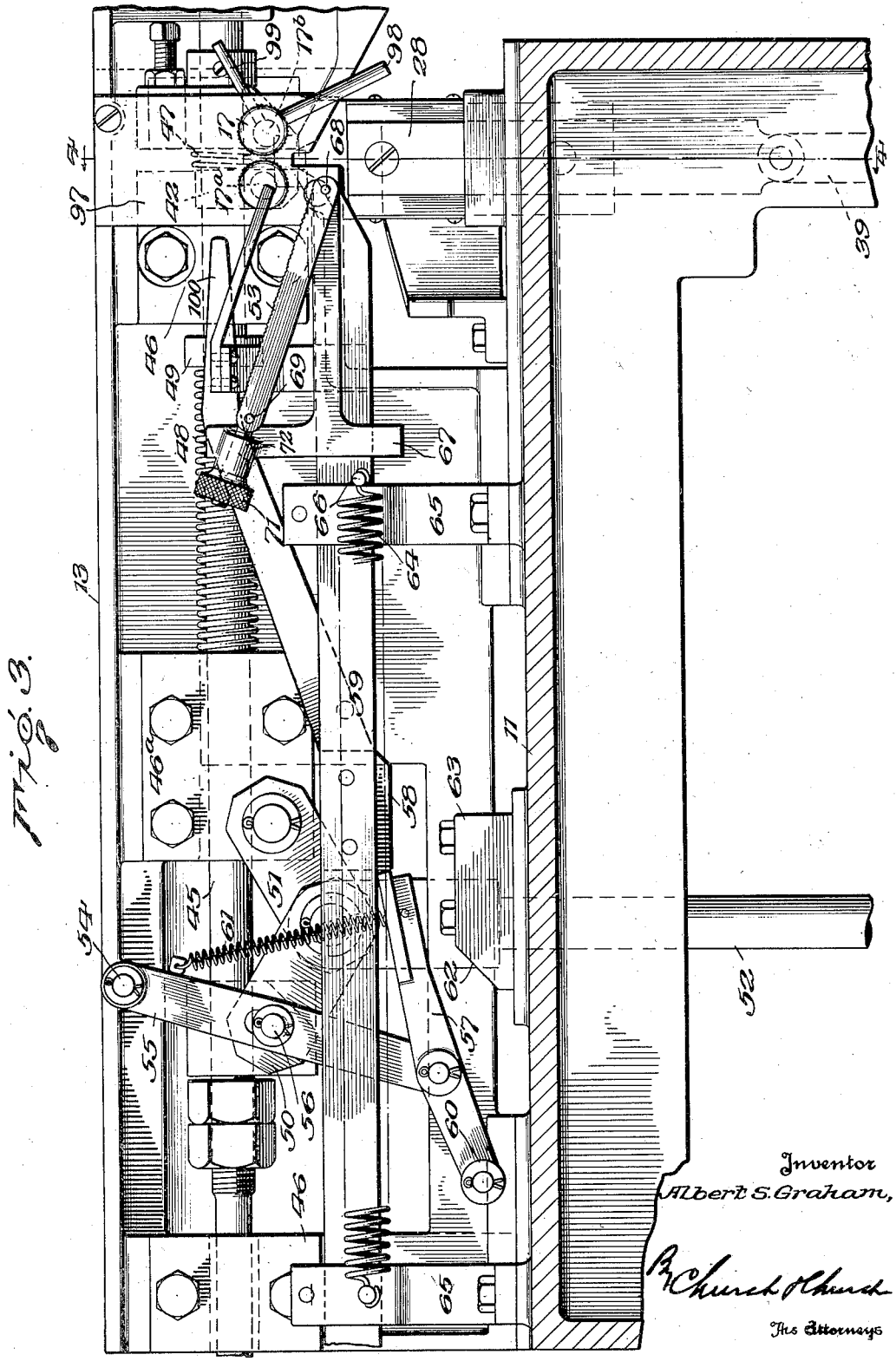

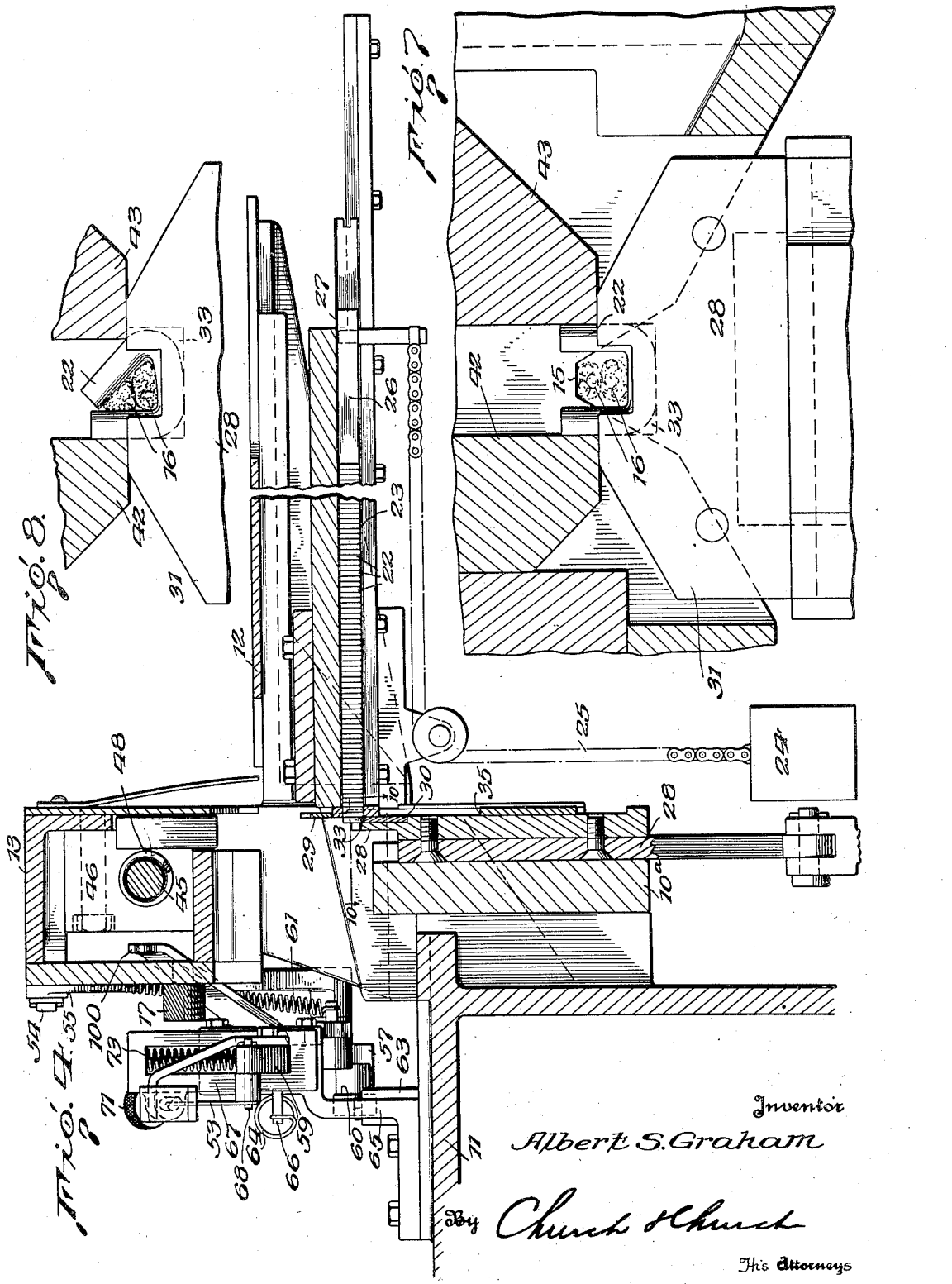

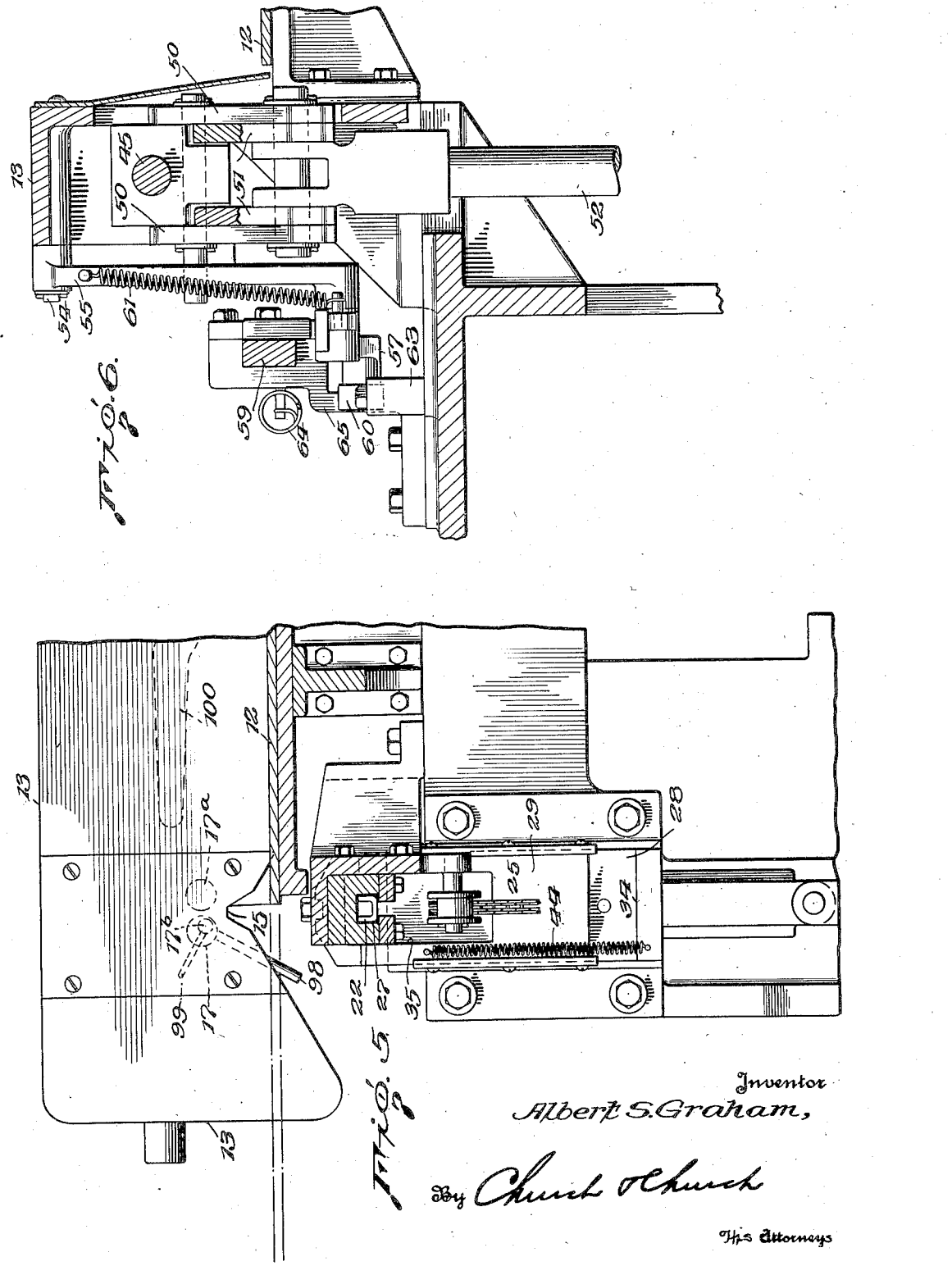

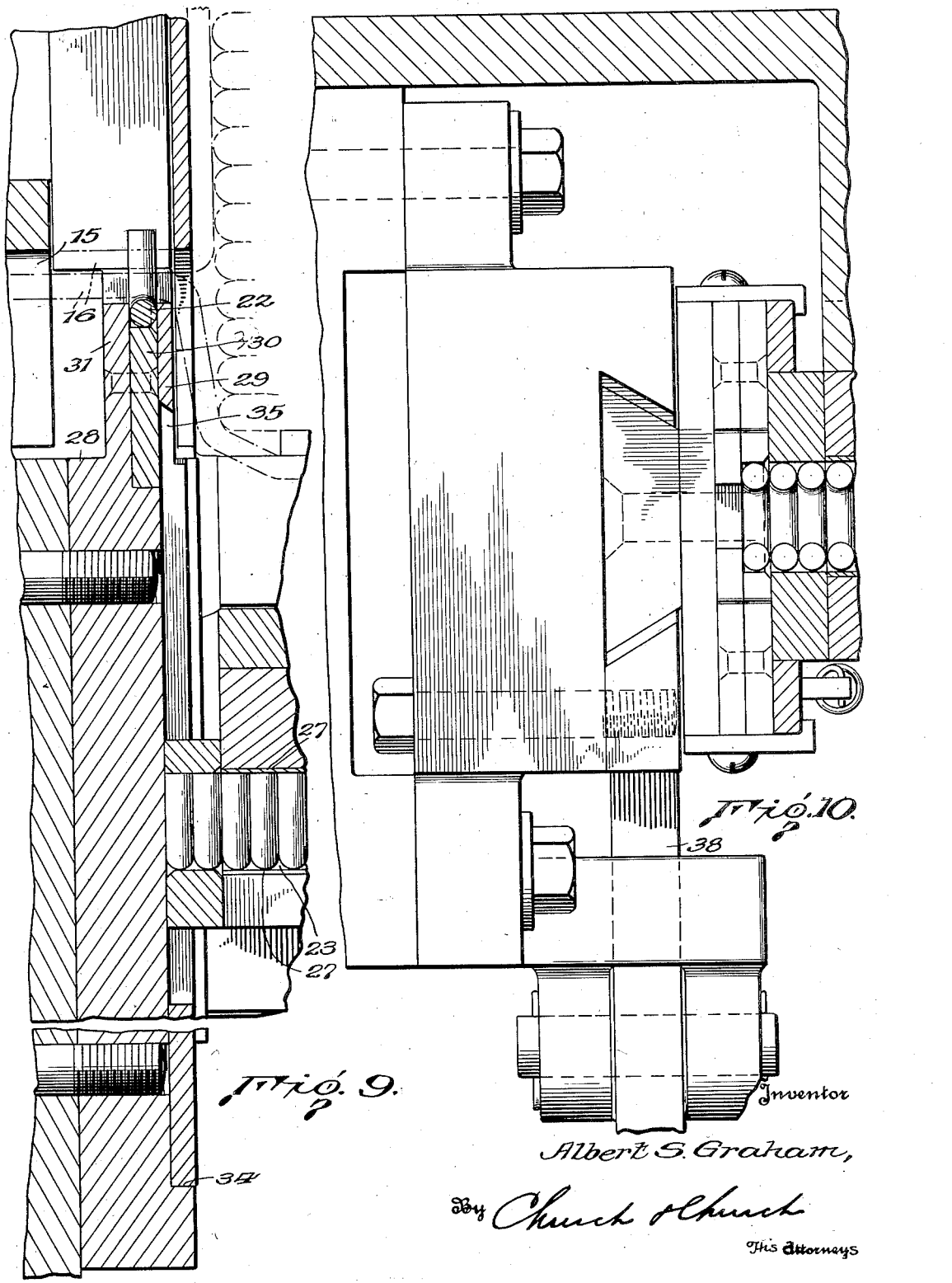

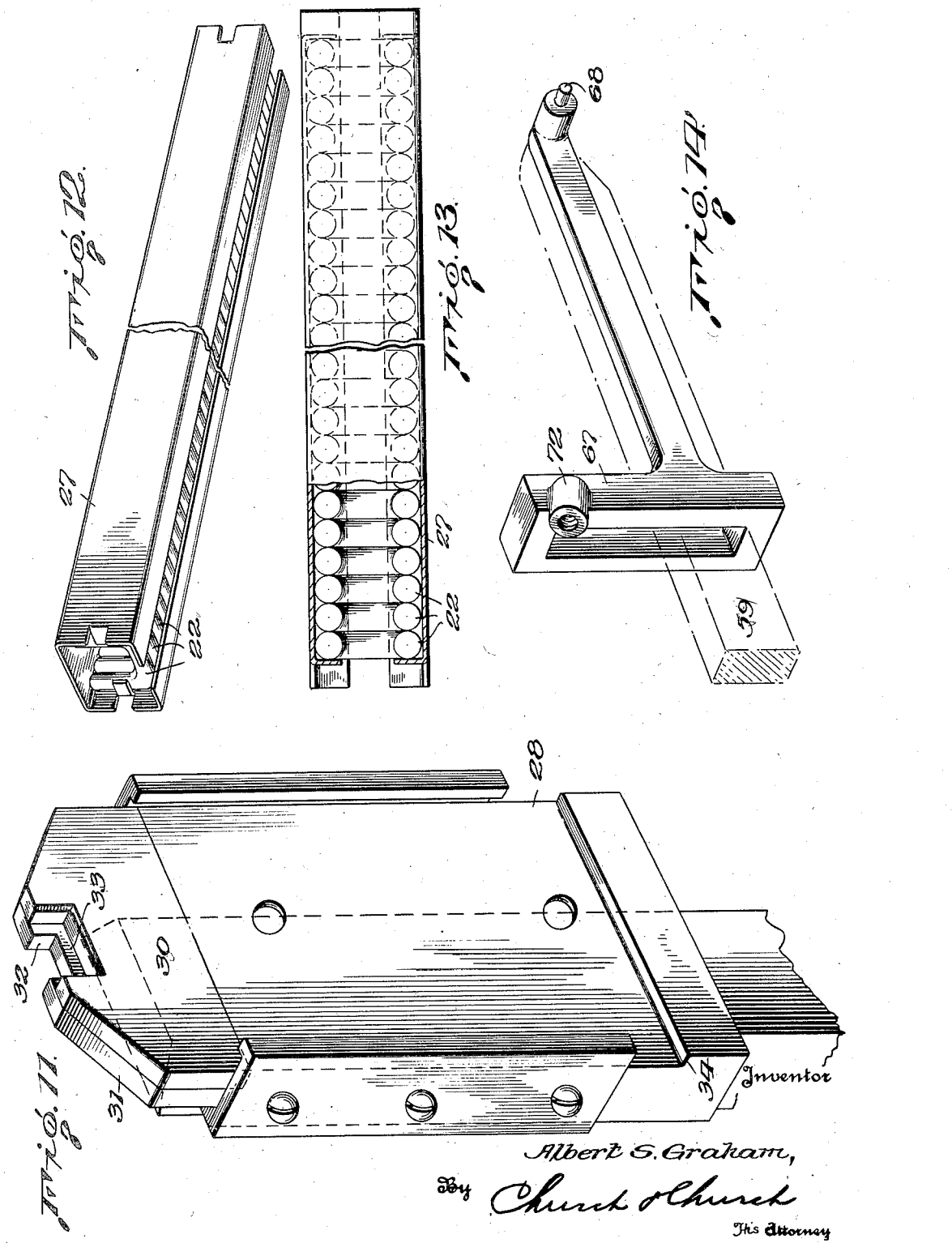

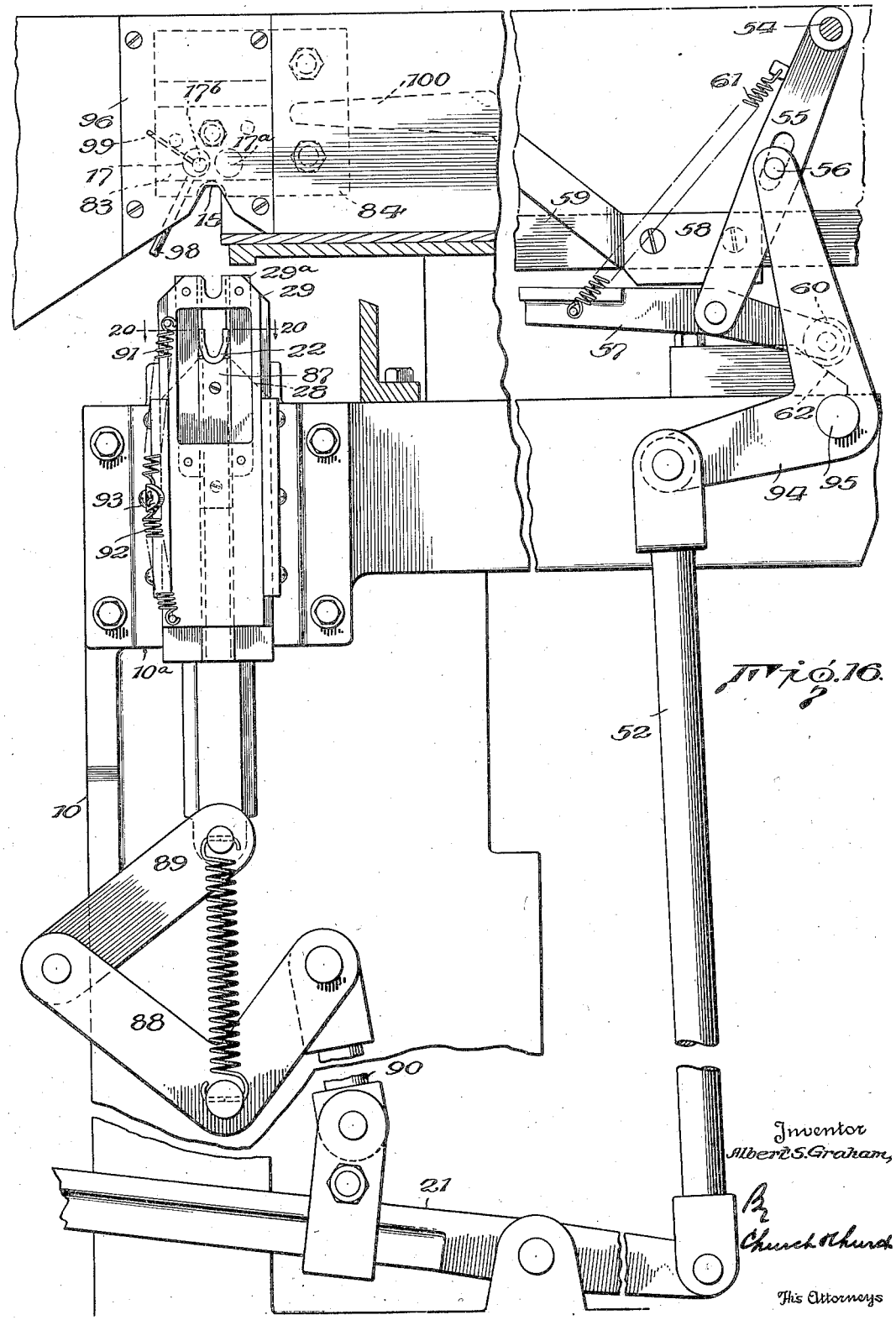

Nov. 26, 1935.   A. S. GRAHAM   2,022,596
BUNDLE TYING MACHINE
Filed July 29, 1932   10 Sheets-Sheet 9
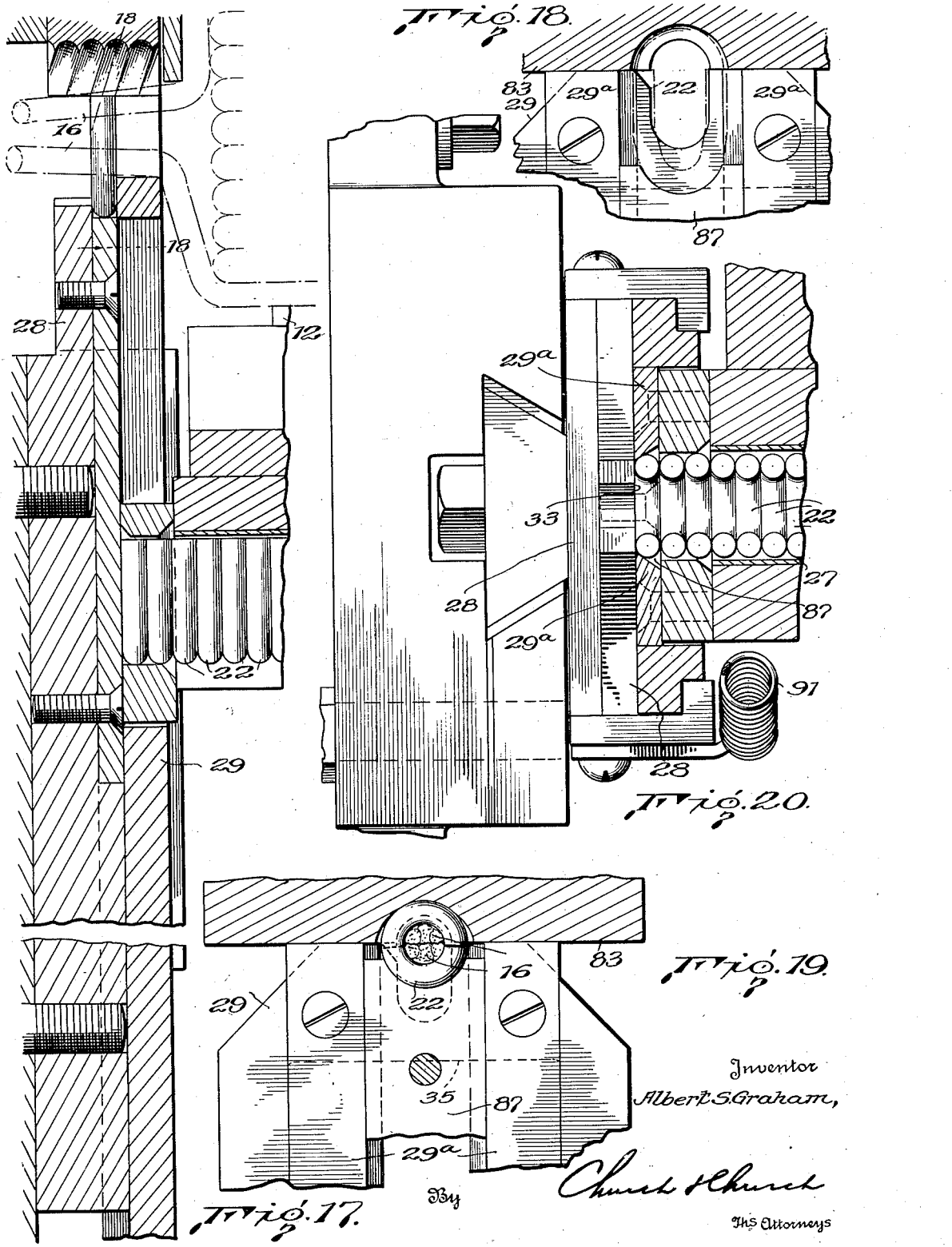
Inventor
Albert S. Graham,
By Church & Church
His Attorneys

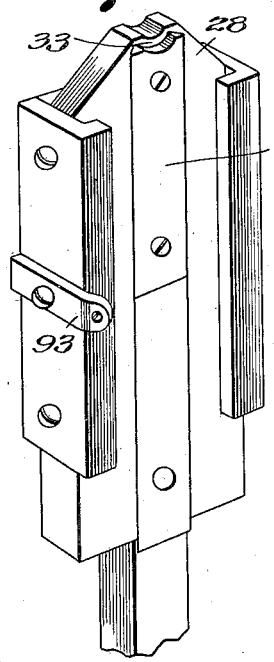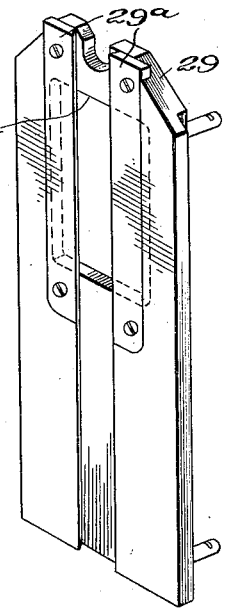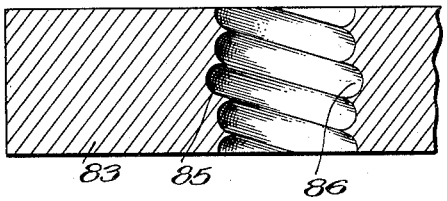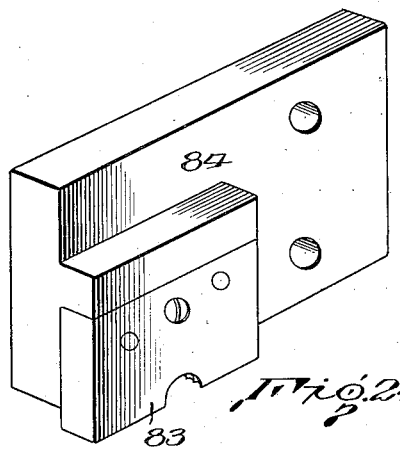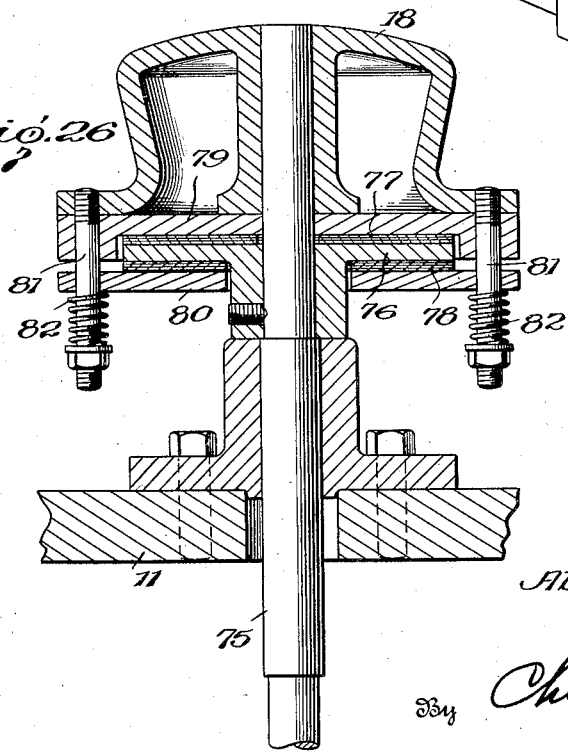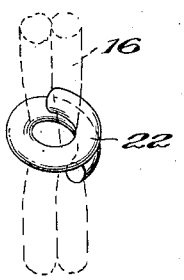

Patented Nov. 26, 1935

2,022,596

UNITED STATES PATENT OFFICE 2,022,596

BUNDLE TYING MACHINE

Albert S. Graham, Auburn, N. Y., assignor to Columbian Rope Company, Auburn, N. Y., a corporation of New York Application July 29, 1932, Serial No. 626,050

9 Claims. (Cl. 100—31)

This invention relates to improvements in bundle tying machines and particularly to machines especially adapted for securely tying bundles of newspapers.

One object of the invention is to provide a machine of the type described wherein the major portion of the work is accomplished by actuating, preferably manually, a single lever. More specifically, the machine comprises a magazine of clips, one of which is fed from the magazine and secured around the ends of each loop of binding element with which the bundle is tied; means for clamping or securing the clip around the binding element; and severing means for cutting the ends of the binding element after the clip has been applied to said element; all of these instrumentalities being actuated by the single operating lever. In one embodiment of the invention, the means for securing the clip around the binding element comprises a pair of clamping jaws actuated by the operating lever but such clamping means may also be of punch and die formation, as illustrated in a second embodiment of the invention.

Another object consists in providing means for temporarily holding a loop of the binding element around the bundle under a regulable tension, the end portions of the binding element leading from the loop being held or positioned in a guide way which is traversed laterally by the severing knife for cutting off said ends after the clip has been applied.

When the binding element is first looped around a bundle, the loose end thereof must be securely retained by some suitable holding means and a still further object is the provision of a holding means from which said end portion will be automatically released.

A still further object is the production of a comparatively inexpensive machine that can be utilized at low cost.

With these and other objects in view, the invention consists in certain details of construction and combinations and arrangements of parts, all as will be hereinafter more fully described and the novel features thereof particularly pointed out in the appended claims.

In the accompanying drawings:

Figure 1 is a perspective view of one embodiment of the present invention;

Fig. 2 is a front elevational view;

Fig. 3 is a front view, partly in section, illustrating the clip closing jaws and the knife for severing the binding element;

Fig. 4 is a sectional view on the line 4—4 of Fig. 3;

Fig. 5 is a rear view, partly in section, illustrating the clip magazine;

Fig. 6 is a sectional view on the line 6—6 of Fig. 2;

Fig. 7 is an enlarged detail view showing an open clip between the clip closing jaws;

Fig. 8 is a similar view, but illustrating the clip closed;

Fig. 9 is a vertical sectional view through the delivery end of the clip magazine, longitudinally of the magazine;

Fig. 10 is a horizontal section at the same point;

Fig. 11 is a perspective view of the clip delivering slide;

Fig. 12 is a perspective view of the clip holder;

Fig. 13 is a top view, partly broken away, of the clip holder;

Fig. 14 is a perspective view of the bracket mounting for the knife;

Fig. 15 is a detail view of a bundle with the reretaining element clipped thereon;

Fig. 16 is a rear elevation, partly in section, illustrating a modified form of machine wherein the clips are secured around the binding elements by instrumentalities of punch and die formation;

Fig. 17 is a vertical sectional view, longitudinally of the delivery end of the clip magazine, illustrating the punch and die arrangement for securing the clips around the binding element;

Fig. 18 is a sectional view on the line 18—18 of Fig. 17;

Fig. 19 is a view similar to Fig. 18, but showing the clip clamped around the binding element;

Fig. 20 is a horizontal section of the structure shown in Fig. 17;

Fig. 21 is a detail perspective of the clip carrier and punch;

Fig. 22 is a similar view of the carrier cover;

Fig. 23 is a detail view of the die member;

Fig. 24 is a perspective view of the die and die block;

Fig. 25 is a detail view of a clip secured around the binding element;

Fig. 26 is a vertical sectional view of the capstan which is used for holding the binder element under a regulable tension when the latter is placed around the bundle to be tied; and Fig. 27 is a detail perspective view of the automatically releasable holding member for initially securing or anchoring the loose end of the binding material when the latter is first looped around a bundle.

The present machine is especially adapted for use in tying bundles of newspapers and the binding material utilized is preferably a vegetable fibre twine of necessary strength but it will be appreciated that the invention is not limited to this particular use nor to the binding material stated.

In the embodiment of the invention illustrated in Figs. 1 to 16, and 27, the mechanism is mounted on a frame composed of standards 10 and platform 11. Projecting rearwardly from said platform is a support 12 for the newspapers or other articles to be bundled or tied. Extending upwardly from the rear edge of platform 11 is a member 13, one of whose ends is offset downwardly as at 14 and then inwardly upon itself, so to speak, with the inturned portion terminating in a slot or guide way 15. A supply of twine 16, preferably a reel, is provided, the reel being rotatably supported in the standards 10. In tying bundles, twine is drawn from the reel and a loop thereof placed beneath support 12 and around the bundle of papers on said support. The free or loose end of the twine is secured between two knurled rollers 17, 17a journaled in a plate 97 on the member 13, and the two lengths of twine leading from the loop around the papers are positioned in the guide way 15. Roller 17 is formed eccentrically with respect to its shaft 17b (see Fig. 27) so that by placing the loose end of binding material between the rollers and turning roller 17 counter-clockwise, said end will be securely clamped between the two rollers by the camming action of roller 17. This loose end is later automatically released by means hereinafter described. The length of twine leading back to the reel 16 may be secured in any suitable way but it is preferably secured by means with which the twine can be placed under tension to draw the loop tight around the bundle. For instance, in the present machine, a capstan 18 journaled in the forward edge portion of platform 11 is driven at the desired speed by a motor 19 through reduction gearing housed in casing 20. With this arrangement two or three turns of the length of twine leading from the reel, through guide 15, can be placed around the capstan and by the operator holding the twine at a point between the reel and capstan, the loop will be drawn tight around the bundle on support 12.

The capstan, illustrated in detail in Fig. 26, comprises the head 18 loosely journaled on a shaft 75 extending upwardly from the gear housing 20 and a circular plate 76 fixed on said shaft and frictionally clutched to said head. For instance, said circular plate is provided on its upper and lower surfaces with leather coverings 77, 78, which are engaged, respectively, by metal discs or plates 79, 80, secured to the head 18 by bolts 81. Springs 82, on the bolts 81 between plate 80 and the heads of said bolts, yieldingly clamp the leather covered plate 76 between the plates 79, 80. The capstan head 18 is rotated by shaft 75 through the frictional engagement of discs 79, 80 with the leather coverings 77, 78 of plate 76, so that when the free end of the twine is wrapped around the head, said twine will be drawn tightly around the bundle. Excessive strain cannot, however, be placed on the twine by the operator holding it too tightly around the head 18 because the discs 79, 80 will slip on the leather coverings under such conditions. In this way, the tension placed on the twine can be regulated by simply adjusting the springs 82 to vary the frictional engagement between the discs 79, 80 and the leather coverings of plate 76.

After the binding material or twine has thus been properly placed around the bundle and while it is thus temporarily held, it is tied or fastened around the bundle, preferably by a metal clip. This operation is performed by mechanism actuated by a foot lever 21.

Referring particularly to Figs. 4 and 9 to 13, a series of U-shaped clips 22 in a rearwardly extending clip magazine 23 are fed forwardly by a weight 24 attached by a chain 25 to a pusher 26. Clips 22 are preferably supported in the magazine by their container 27 whose bottom wall is slotted to permit the feeding of the clips. At the front end of the clip magazine there is a clip carrier 28 slidable vertically in a way in a casting secured at the rear portion of the frame. The clip at the front of the magazine is received in this carrier 28, the clip being supported at the front of its base portion and along its two arms by the carrier. At the time the carrier is in its lower position (Fig. 4) the clip is, of course, supported at its rear by the other clips in the magazine. Associated with the carrier is a carrier cover 29, and when a clip is elevated by the carrier, said cover supports the clip at its rear. As shown in Fig. 11, the carrier 28 is formed of two sections 30, 31, at its upper portion and each of said sections is formed with a recess 32 in its upper edge. However, the recess 32 in section 30 is a little deeper than that in section 31, thereby forming a lip 33 for supporting the clips at the front. Carrier cover 29, before referred to, has an opening 35 therein and the cover extends around the front end of the magazine. Formed at the bottom of section 30 of carrier 28 is a ledge or shoulder 34. When the carrier is in its lower position (Fig. 4), cover 29 is supported at its top by the magazine but when the carrier is elevated to deliver a clip, ledge 34 engages and also elevates the cover so that the clip is properly supported at its rear as before mentioned. Carrier 28 is raised and lowered by the main operating lever 21 pivoted on the base of the machine frame. Pivotally attached to lever 21 is a link 37 which, in turn, is connected to a lever 38 pivoted on standard 10 and the carrier is connected to lever 38 by a link 39. By depressing lever 21, the carrier is raised and spring 36, attached to said lever and the frame, retracts the lever to return the carrier to its normal lowered position. The return of the carrier is also augmented by spring 44 (Fig. 5) which tends to hold said carrier down against the upper surface of the magazine. Link 37 is of special construction in that it is composed of a bifurcated member, the bifurcations of which are attached to lever 21 and whose opposite end is formed with an aperture through which a rod 40 extends, said rod being threaded in a coupling attached to lever 38. A spring 41 on rod 40 causes initial motion of lever 21 to be transmitted to the carrier but as the lever 21 is further depressed to actuate other mechanism (later described) spring 41 is compressed so that the carrier and clip are forced upward with increasing pressure to counteract any downward pressure that might be caused by the closing of the clip by the jaws.

A clip, supported in the carrier between the clip closing jaws 42, 43, and with the two ends of the twine 16 confined between the arms of the clip within the guideway 15, is illustrated in Fig. 7. Assuming that the clip has been delivered from the magazine, as before described, to this position, a relative movement of the jaws is then effected to close the clip around the twine as shown in Fig. 15. Preferably one jaw 42 is stationary and the other jaw 43 only is moved by mechanism shown in Figs. 2 to 6. As stated, jaw 42 is fixed in the upper portion of the frame, but jaw 43 is mounted on one end of a rod 45 slidable through the jaw 42 and in a plurality of bearings 46, 46a. A spring 47 interposed between the jaws and a second spring 48 interposed between bearing 46a and a collar 49 on rod 45 tends to hold the jaws 42, 43, separated. Extending upwardly from lever 21 is a rod 52 to which toggle links 50, 51, are attached. Links 51 are attached to bearing block 46a and links 50 are attached to rod 45 whereby, as lever 21 is depressed and rod 52 raised, the toggle links will be expanded and rod 45 slid in its bearings to move jaw 43 toward jaw 42, and close clip 22 as shown in Fig. 8.

After the clip has been closed around the twine, the ends or lengths of the latter are severed by a knife 53 operated by the mechanism shown in Figs. 1 to 6. Pivoted at 54 in the upper portion of the machine frame, is a link 55, which is pivotally attached to one of toggle links 50 at 56 and at its lower end said link supports a swingable latch plate 57. One end of plate 57 is enlarged and is adapted to engage behind a lug 58 on a bar 59 which carries knife 53. The other end of latch plate 57 is provided with a cam roller 60. The latch plate normally occupies the position in which it is shown in Figs. 1 and 2, but as rod 52 is elevated and toggle links 50, 51, expanded, link 55 will swing the plate to a point where its enlarged end will be raised by spring 61 to engage behind the lug 58 as shown in Fig. 3. Then, as rod 52 is lowered after the operator releases lever 21, and toggle links 50, 51, return to their normal position, the swinging movement of link 55 will cause latch plate 57 to push knife bar 59 and move knife 53 across or past guide way 15, severing the twine. As the knife bar reaches the limit of its movement, the cam roller 60 on latch plate 57 engages the cam surface 62 on block 63 on the frame and depresses the enlarged end of the plate, thereby disengaging said plate from lug 58. Knife bar 59 is then retracted to its original normal position by a spring 64. The knife bar is slidable in guide standards 65 and spring 64 is attached to one of said standards and to a pin 66 on said bar, said pin engaging the other standard to limit the retractive movement of the bar.

Referring to Figs. 3 and 14, knife 53 is mounted on a frame 67, one end of the knife being held on a pin 68 on the frame and the other end on a pin 69 on a screw element 70 extending through an eye 72 in the frame. A nut 71 on said screw element permits the proper tension to be placed on the knife. One end of the frame 67 has a rectangular opening therein through which the knife bar 59 extends and the other end of the frame is pivotally supported by the pin 68. Secured in the opening between the top of the frame and the knife bar, is a spring 73 (Fig. 4) which raises the knife, but the latter is free to yield and be depressed by the twine as it severs the same. This yielding mounting for the knife is provided because constant usage of a limited portion of the knife edge will dull it but by being capable of changing its inclination, a different portion of the knife edge will function as previously used portions become dull.

The automatic release of the loose end of binding material from between rollers 17, 17a, is accomplished by means carried by the knife bar 59. Referring particularly to Figs. 3 and 27, roller 17 is provided with a radially projecting pin 98 to facilitate manipulation thereof by the operator, and at the rear of plate 97, shaft 17b is provided with a radially projecting trip 99. Trip 99 is offset circumferentially with respect to pin 98 and when the latter is moved counter-clockwise to clamp the end of the binding material between the two rollers, the trip is simultaneously moved to a point where it will be positioned in the path of a trip finger 100 mounted on knife bar 59. That is, when the knife is advanced to sever the binding material, finger 100 will engage trip 99 and rotate shaft 17b and roller 17 in a reverse direction, thereby freeing the loose end. This eliminates one operation on the part of the operator and permits the preparation of bundles at a greater speed.

To facilitate removal of the tied bundles from the support 12, the end portion thereof in proximity to the twine guide way 15 is of reduced width.

In the form of the invention illustrated in Figs. 16 to 26, the form preferred where it is desired to overlap the ends of the clips applied to the twine, the clamping jaws and a portion of their operating connections are eliminated and the clips closed by a punch and die arrangement. The die block 83 is mounted on a die block support 84 bolted to the rear of the machine, said block is formed with two parallel arcuate grooves 85, 86, that extend transversely of the guide way, and the lengths of twine positioned in the guide way. The block is also mounted in alinement with the path of the clips elevated by the carrier, so that the ends of the arms of the clips will register with and be initially received in the ends of said grooves.

In this embodiment, the carrier 28 is also modified somewhat in that the carrier has mounted therein a punch 87, the upper end of the latter terminating just below the upper end of the carrier to form the lip 33 which assists in supporting the clip at the front. The clip is also supported at the front during its movement from the magazine to the die by guides 29a on the carrier cover 29. Said cover supports the clip at its rear as in the former construction.

For raising and lowering the clip carrier 28 and cover 29, a bell crank lever 88 has attached to one arm a link 89 which, in turn, is attached to the lower end of the carrier, as shown in Fig. 16. Lever 88, which is pivotally mounted on the machine frame, and link 89, form essentially a toggle link arrangement. The other arm of lever 88 is connected by a link 90 to the foot lever 21. As will be understood, depressing lever 21 will cause the lever 88 and link 89 to have a toggle link action and raise the carrier 28 to elevate a clip from the magazine to the die block 83. As before mentioned, the ends of the clip will first engage in the opposite ends of grooves 85, 86, and continued upward movement of the carrier and punch 87 will bend the clip ends over along their respective grooves and past each other, so that the twine will be firmly secured as shown in Fig. 25.

As in the construction shown in Figs. 1 to 16, cover 29, in the present instance, also rests on the top of the magazine when the carrier is in its lowermost position. To permit the carrier to initially move upward relatively to the cover so that the clip, once removed from the magazine, will be supported at its rear by the cover, springs 91, 92, are attached to a post 93 on the carrier and to the upper and lower ends, respectively, of the cover. With this yielding connection, the carrier will first move upwardly relatively to the cover, until the lower spring 92 is placed under a certain tension, whereupon the carrier and cover will move in unison, until the cover engages the lower surface of die block 83. Then the cover remains stationary while the carrier, punch and clip are raised further to clamp the clip around the twine as before described. When foot lever 21 is released and carrier 28 depressed, the spring 91 will insure return of cover 29 to its normal, lowered position.

The substitution of the punch and die arrangement for the clamping jaws also lends to simplification of the operating connections for the knife 53. That is, the connecting rod 52 is attached at its upper end (Fig. 16) to one arm of a bell crank lever 94 pivoted at 95 at the rear of the machine, and the other arm of said bell crank lever is attached to link 55 pivoted at 54 on the machine frame. Raising and lowering of the foot pedal 21, to which the lower end of connecting rod 52 is attached, therefore, actuates knife 53 just the same as in the previously described construction.

The die block 83 is preferably protected by a cover plate 96 removably secured at the rear of the machine to permit use of interchangeable dies of varying sizes.

From the foregoing it will be seen that bundles, especially newspapers, may be expeditiously bound or tied. The operator need only place the twine around the bundle, secure the loose end between rollers 17, 17a, and place one or two turns of the other length around capstan 18. Then, by holding the latter end, the revolving capstan will draw the twine tight around the bundle and, by depressing foot lever 21, the clip is fed to position and clamped around the two lengths of twine within guide way 15. The twine is then severed by knife 53 and the loose end released from between rollers 17, 17a.

What I claim is:

1. In a machine of the character described, the combination of a support, means for temporarily retaining a binding element around articles on said support, a lever, a fixed clamping jaw, a second jaw slidable toward and from the fixed jaw, a slidably mounted knife for severing said binding element, means for feeding successive clips between said jaws and means operable by said lever for moving the slidable jaw toward the fixed jaw to secure a clip around said binding element and for moving said slidable knife.

2. In a machine of the character described, the combination of a support for the article to be bound, and a knife movable laterally of the binding element for severing said element after it is clipped, said knife being yieldingly supported at an angle with respect to its direction of movement.

3. In a bundle tying machine, a frame, a guide way in which the ends of a binding element may be positioned to form a loop around a bundle to be tied, a rod slidable in said frame, a clamping jaw at each side of said guide way, one of said jaws being mounted on said rod, means for feeding clips between said jaws, a bar slidable transversely of said way, a knife on said bar, a manually operable lever, and connections between said lever and said bar and rod whereby said jaws may be closed and said knife moved transversely of said way, said jaws being actuated in advance of said knife.

4. In a machine of the character described, the combination of a support, means for temporarily holding the ends of a loop of binding material around articles on said support said ends being disposed substantially parallel to each other, a fixed die member having parallel grooves extending diagonally of the ends of binding material and means for positioning a clip around said ends with the ends of the clips in said grooves and for bending said clip ends along said grooves past each other and around the binding material.

5. In a machine of the character described, the combination of a support, means for holding the ends of a loop of binding material around articles on said support, said ends being disposed substantially parallel to each other, a fixed die member having spirally arranged grooves extending transversely of the ends of the binding material, and a carrier mechanism movable relatively to said die member for positioning a clip around the ends of the binding element and closing the said clip by forcing its ends into the die and causing said clip ends to curl around the binding element and overlap each other.

6. In a bundle tying machine, the combination of a support, means for temporarily holding the ends of a loop of binding material placed around the articles on said support, means for applying a clip to said looped binding material, a slidably mounted bar, a knife on said bar for severing the ends of the binding material, a trip, and means on said bar for actuating said trip and releasing one of the temporarily held ends of the material.

7. In a machine of the character described, the combination of a support for the articles to be bound, means for temporarily retaining a binding element around articles on said support, said means comprising a pair of rollers between which one end of the binding element is clamped, one of said rollers being journaled eccentrically adjacent the other roller, means for automatically releasing the end of the binding element secured between said rollers, and means for severing the other end of said binding element.

8. In a bundle tying machine, the combination of a support, means for temporarily holding the ends of a loop of binding material placed around articles on said support, means for applying a clip to said looped binding material, a slidably mounted bar, a knife on said bar for severing the ends of the binding material, and means operable by said bar for releasing one of the temporarily held ends of the binding material.

9. In a machine of the character described, the combination of a support, means for temporarily holding the ends of a loop of binding material around articles on said support, a die member having a pair of parallel grooves therein extending diagonally of the ends of said material, a source for a supply of open clips, and means for positioning the ends of a clip in opposite ends of said grooves and forcing said clip ends along said grooves toward and past each other and around the binding material.

ALBERT S. GRAHAM.